United States Patent [19]
Cline et al.

[11] Patent Number: 4,719,585
[45] Date of Patent: Jan. 12, 1988

[54] DIVIDING CUBES SYSTEM AND METHOD FOR THE DISPLAY OF SURFACE STRUCTURES CONTAINED WITHIN THE INTERIOR REGION OF A SOLID BODY

[75] Inventors: Harvey E. Cline, Schenectady; Siegwalt Ludke, Scotia; William E. Lorensen, Ballston Lake, all of N.Y.

[73] Assignee: General Electric Company, Schenectady, N.Y.

[21] Appl. No.: 770,164

[22] Filed: Aug. 28, 1985

[51] Int. Cl.⁴ .................................................. G06F 3/14
[52] U.S. Cl. .................................. 364/518; 340/729; 340/734; 364/521; 364/522
[58] Field of Search .................................. 364/518–522; 340/703, 747, 728, 741, 723, 729, 739

[56] References Cited

U.S. PATENT DOCUMENTS

| | | | |
|---|---|---|---|
| 4,475,104 | 10/1984 | Shen | 340/720 |
| 4,594,673 | 6/1986 | Holly | 364/521 X |
| 4,622,641 | 11/1986 | Stephens | 364/521 X |

OTHER PUBLICATIONS

Machover, C., and Myers, W., "Interactive Computer Graphics", *Computer Magazine*, IEEE Computer Society Publication, (Oct. 1984), pp. 145–161.
Paul, J. Lawrence, "Three Dimensional Display of Objects from Planar Contours", *Graphics Interface '83*, pp. 129–131.
Gideon Frieder et al., "Back-to-Front Display of Voxel-Based Objects", IEEE CG&A, Jan. 1985, pp. 52–60.
Karl H. Hohne et al., "Shading 3D Images from CT Using Gray-Level Gradients", *IEEE Transactions on Medical Imaging*"(Short Papers), vol. MI-5, No. 1, Mar. 1986, pp. 45–47.
Wolff, Carlo, "Surgeon Repairs Skull Fractures With Help of 3-D Computer Images", Schenectady Gazette, 1985.
Johnson, Ken, "Here's Looking at You", The times Union, Jun. 5, 1985.

*Primary Examiner*—Emanuel S. Kemeny
*Assistant Examiner*—H. R. Herndon
*Attorney, Agent, or Firm*—Lawrence D. Cutter; James C. Davis, Jr.; Marvin Snyder

[57] ABSTRACT

A system for displaying three dimensional surface structures employs the analysis of voxel elements defined by eight cubically adjacent grid locations which are associated with at least one physical property defined throughout a three dimensional body. The physical property measurements may be made with such systems as computerized tomographic x-ray systems, or magnetic resonance imaging devices. Surface structures are defined by a user selected threshhold value such as distinct values for skin and bone in medical diagnostic applications. Selected voxels are subdivided and means are provided for generating signal values associated with intermediate additional grid locations. Means are also provided for generating surface normal vectors associated with these grid locations. The system of the present invention produces a sequence of signals representative of grid locations throughout the object being investigated together with associated surface normal vectors at these locations, the locations lying on a user selected surface. The system provides smooth, high resolution images which particularly useful for medical diagnostic applications and is particularly useful with conventional display processor hardware used for electronic graphics display. The capabilities of the system additionally provide enhanced flexibility and speed for the convenience of interactive users.

8 Claims, 7 Drawing Figures

DIVIDING CUBES SYSTEM AND METHOD FOR THE DISPLAY OF SURFACE STRUCTURES CONTAINED WITHIN THE INTERIOR REGION OF A SOLID BODY

BACKGROUND OF THE INVENTION

The present invention is generally directed to a system and method for displaying surface information. The images of the surfaces displayed are typically contained within the interior regions of solid bodies which are examined by computed tomographic (CT) x-ray systems or by magnetic resonance (MR) imaging systems either of which is capable of generating three dimensional arrays of data representative of one or more physical properties at various locations within a three dimensional volume. More particularly, the present invention is directed to a system and method for the display of medical images so as to obtain representations of internal bodily structures. The images generated in the practice of the present invention provide three dimensional data for examination by physicians, radiologists and other medical practitioners.

In conventional x-ray systems, a two dimensional shadow image is created based upon the different absorption characteristics of bone and soft tissues. A great improvement on the conventional x-ray systems as a diagnostic tool has been provided by computed tomographic systems which have been developed over the last ten years or so. These so called CT systems are x-ray based and initially were used to produce single two dimensional views depicting transverse slices of a body, object, or patient being investigated. Three dimensional information was thereafter gleaned from CT scan data by generating data for a number of contiguous slices and using the inferential abilities of the radiologist to suggest a three dimensional representation for the various internal organs. In one embodiment of the present invention, shaded and contoured three dimensional images are generated from the three dimensional array of data generated by a sequence of such contiguous CT scans. In the same way, the newer MR imaging technology is also capable of generating three dimensional arrays of data representing physical properties of interior bodily organs. Moreover, MR systems have the capability to better discriminate between various tissue types, not just bone and soft tissue. MR imaging systems are also capable of generating physiological data rather than just image data. However, whether MR or CT systems are employed, the data has been made available only as a sequence of the slices and systems have not generally been available which provide true three dimensional images.

In the present invention, three dimensional data generated either by a CT scanning system or by an MR imaging system may be displayed and analyzed in a plurality of ways so as to produce on a display screen or other device, a multitude of anatomical features which are selectable at the viewer's choice. In the system and method of the present invention, the data used to produce the three dimensional images is typically acquired once and then used and re-used to generate information and to display images at the option of the viewer. The viewer is provided with the option of selecting one or more threshhold values which determine, for example, whether or not bone surfaces as opposed to brain surface tissue is to be displayed. The viewer or operator of the present system can also select the appropriate viewing angle and can, at will, selectively ignore segments of the data generated in order to provide cross sectional views through any desired plane. Moreover, the viewing angle is selectable and it is possible to generate a sequence of images and display them sequentially to provide the medical practitioner with interior views of solid surfaces in a truly three dimensional manner from any desired viewing angle with the further capability of being able to construct a view through any plane or slice. Again, it is pointed out that for many purposes, an almost infinite variety of meaningful images can be created from only a single set of MR or CT scan slice data arrays. Certainly though, if the objective of the medical investigation is the study of internal anatomic variations as a function of time, then it meaningful to produce a sequence of three dimensional data arrays indexed by time. The system and method of the present invention provide the medical practitioners, and surgeons in particular, with the ability to plan detailed and complicated surgical procedures using totally non-invasive diagnostic methods. The images generated by the present invention can only be described as truly dramatic and show every evidence of being as great an improvement in the medical imaging arts as computed axial tomography and magnetic resonance imaging.

While the system and method of the present invention will undoubtedly find its greatest utilization in the analysis and display of tomographic x-ray and magnetic resonance imaging data, the system of the present invention is equally applicable to systems employing ultrasound, positron emission tomography, emission computed tomography and multi-modality imaging. Moreover, while the present invention is particularly applicable to the construction of medical images, it is also pointed out that the system and method of the present invention is applicable to the display of interior three dimensional surface structures for any system which is capable of generating three dimensional data arrays in which signal patterns are present which represent the value of at least one physical property associated with points in a solid body.

A particular advantage of the present invention is its ability to provide the medical practitioner with the means to perform interactive functions in real time. Systems which do not permit interactive use suffer a significant disadvantage since a real time display methodology is required for optimal human interaction with the system, particularly in the case of a surgeon planning a difficult procedure. For example, in transplant surgery, it is often difficult to ascertain beforehand the precise shape or size of a body cavity which is to receive an implant. This is true whether or not the implant comprises human tissue or a mechanical device. It is therefore seen that it would be very important for a surgeon to be able to display the cavity in question on a screen in three dimensional form and be able to rotate it and section it at will, before any invasive procedure is undertaken. It is also important to such medical practitioners that the images generated are sharp and exhibit excellent contrast. The images generated should also depict surface texture wherever this is possible.

The display of three dimensional graphic images on a cathode ray tube (CRT) screen has principally been driven by the goals and directions of computer aided design (CAD) and computer aided manufacturing (CAM). Systems have been developed for displaying solid bodies and for manipulating images in various fashions to create solid models for manufactured parts and for rotating and viewing these parts from a multiplicity of directions. In particular, CAD/CAM systems have been developed which accept data in two basic formats. In a wire-frame display format, the display processor is provided with a sequence or list of three dimensional points representative of the end points of line segments. These line segments are joined to represent various surface structures. An advantage of these wire frame images is the ability to rapidly rotate the image about various axes to obtain different views. In the other format, the raster format, an image is generated on a screen or other display device as a collection of individual picture elements (pixels) whose intensity and color are determinative of the image displayed. In the raster based format, an electron beam is typically made to scan across a phosphorous screen in horizontal lines which are sequentially "painted" on the screen. The system and method of the present invention are more closely related to the raster based format and representation than the so-called vector based method. The vector based/polygonal approaches described in application Ser. No. 741,390 filed June 5, 1985 and application Ser. No. 741,391 filed June 5, 1985 by one or more of the present inventors, said applications being assigned to the same assignee, are particularly accurate in their representation of surface detail. In these two patent applications, the polygonal resolution was in general not related to the resolution of the screen on which the image was displayed. However, a particular advantage of the present invention is that, by subdivision and interpolation, 3-D images may be generated with a resolution which closely matches the resolution of the screen. This resolution is typically measured in dots or pixels per inch. Alternatively, screen resolution may be expressed in terms of dot pitch with typical high resolution screens having a dot pitch of approximately 0.3 dots per millimeter in current devices. The raster format is particularly useful for displaying images which are more closely related to images as perceived by the human eye, as opposed to wire frame images.

Related work in the field of displaying three dimensional images has been carried out by Gabor Herman who has employed a method in which each adjacent volume element is analyzed and quantized to discrete zero and one values. Surface approximations are made only by considering cube faces and surface normal information can only be partially reconstructed because of the quantization step that is performed. The resulting method produces low resolution images.

Meagher, working for Phoenix Data Systems, has employed a method of octree coding in which the three dimensional data array is subdivided into eight regions and each region is subdivided until individual volume elements are formed. Regions not containing surfaces are not subdivided. However, this method requires special purpose hardware. While the images are crisp, individual volume elements produce a quantized artifact that is not observed in smooth tissues such as bone. Other methods for displaying three dimensional data are, for example, described in U.S. Pat. No. 4,475,104 issued Oct. 2, 1984 in the name of Tsu Y. Shen. This patent appears to disclose a three dimensional display system which incorporates a depth buffer to provide separate 3D information as part of the mechanism for generating appropriate shading values.

Accordingly, it is seen that it is an object of the present invention to provide a system and method for the display of three dimensional information.

It is a further object of the present invention to provide a display system for use in conjunction with CT scanners, ultrasound devices, MR imaging systems, and any and all other systems capable of generating three dimensional data representative of one or more physical properties within a body to be studied.

It is yet another object of the present invention to provide a graphic system for medical images which is capable of interactive use and yet at the same time produces high quality images providing textural, shading, and other visual clues to the user.

It is yet another object of the present invention to provide a three dimensional graphics display system which is compatible with current CAD/CAM systems.

Another object of the present invention is the generation and display of three dimensional raster format based information.

Still another object of the present invention is to maximize the information contained in a three dimensional data array for the purpose of surface representation.

It is also an object of the present invention to provide a system and method which is readily fabricatable in conventional electronic hardware, especially that used in CAD/CAM systems.

It is yet another object of the present invention to provide medical practitioners with the ability to emulate surgical procedures graphically prior to undertaking invasive measures.

Additionally, it is an object of the present invention to provide a plurality of three dimensional surface views from a single set of collective data.

Lastly, but not limited hereto, it is an object of the present invention to provide a system and method for the display of three dimensional images of internal surface structures in such a way that the specific viewing angle and cross sectional viewing plane may be selected by the user in an interactive manner.

SUMMARY OF THE INVENTION

In accordance with a preferred embodiment of the present invention, a system for displaying three dimensional surface structures comprises means for storing three dimensional signal patterns which represent the value of at least one physical property which is associated with a three dimensional body at regularly spaced grid locations defining the volume elements within the body. The system includes means for retrieving the thirty-two three dimensional signal pattern values which are associated with each set of eight cubically adjacent grid locations. These include the twenty-four additional grid locations which are adjacent to the eight cube vertices with each of the cube vertices being associated with three additional grid locations. As used herein and in the appended claims, the term "cubically adjacent" refers to grid locations which exist at the eight corners or vertices of a cube, or more generally, parallelopiped. The system also includes means for comparing the signal values associated with the eight adjacent grid locations, which define a volume element or voxel, with a predetermined threshhold value to determine those volume elements for which at least one of the eight comparisons results in a value distinct from the other seven comparisons. This first comparison operation acts to identify and select those volume elements through which the desired surface passes. The surface itself is determined by the threshhold value and is selectable by the user. The system also includes first means for generating normal vectors from the thirty-two signal pattern values associated with each voxel element. It is these normal vectors in concert with a user selectable viewing angle (elevation and rotation), that determines shading for the image displayed. Second generating means are also provided for generating, for each selected volume element, a plurality of additional signal values associated with additional spacial locations defined along the edges and within the interior of the selected volume elements. In effect, this generating means subdivides the volume element and increases the resolution and smoothness of the resulting image. The subdivision of the volume preferably, though not exclusively, employs a factor of 2 or a power thereof to perform the necessary subdivision. This generating means is an important aspect of the present invention since it permits the construction of images in which the physical resolution of the data collected is closely matched to the pixel resolution on the display device. This is a very desirable feature of the present invention since it permits optimal use of the data available in terms of the display device being employed. It is also particularly advantageous in that it facilitates zooming and enlargement operations. The system of the present invention also includes second comparison means for comparing signal values associated with each subdivided voxel element with the same predetermined threshhold value so as to generate a sequence of selected values which identify grid locations and additional spacial locations which at least approximately lie on a surface determined by the threshhold value. Also included is a third means which operates to generate normal vectors which are associated with the above-described additional spacial locations. The signal values associated with the additional spacial locations are computed using linear or other interpolation methods. However, linear interpolation has been found to be sufficiently fast and accurate for the method and system disclosed herein. The means for generating normal vectors associated with the additionally defined spatial locations also preferably employs linear interpolation. The generation means described herein are configured so that originally selected grid locations and additionally selected spacial locations are associated with their corresponding vectors for these locations. Accordingly, in accordance with one embodiment of the present invention, the output signal produced is representative of grid coordinate locations for points selected to lie on a given surface, these points being associated with normal vectors which are employed by a display processing system to produce the desired image. Such display processing systems receive information in formats that are well known to those skilled in the electronic graphic display arts. Such systems employ normal vector information to determine the desired degree of shading and/or color which is applied to each pixel location. A method for carrying out the above-identified storage retrieval generation and comparison operations is also disclosed herein.

In the display of three dimensional surface images, say for example, on a CRT screen, it is very important to provide visual clues to the human eye with respect to orientation of each part of the surface. These visual clues are provided by shading the various picture elements which are displayed. For example, the more closely the normal direction to the surface is to the viewer's line of sight, the lighter is the shading that is applied (at least for positive rather than negative images). Surface segments which exhibit normal directions with components directed away from the line of sight represent surface structures which are not visible and therefore these normal directions provide a mechanism for eliminating such surface pixels from the view for a particular viewing angle. Surface elements having normal vectors with substantial components in a directional orthogonal to the viewing direction are represented by more darkly shaded pixel elements.

In the medical aspects of the present invention, a discriminating threshhold value or range of values may be chosen so as to selectively view various body structures. For example, if one wishes to view bony structures, a particular threshhold value is chosen. However, if one wishes to view the surface structures of softer tissue, a different threshhold value is selected by the operator. In any event, the system for displaying such three dimensional surface structures should include accurate means for determining local surface normal directions, since it is these directions which greatly enhance the ability of the viewer to recognize the shading clues for a truly three dimensional representation.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
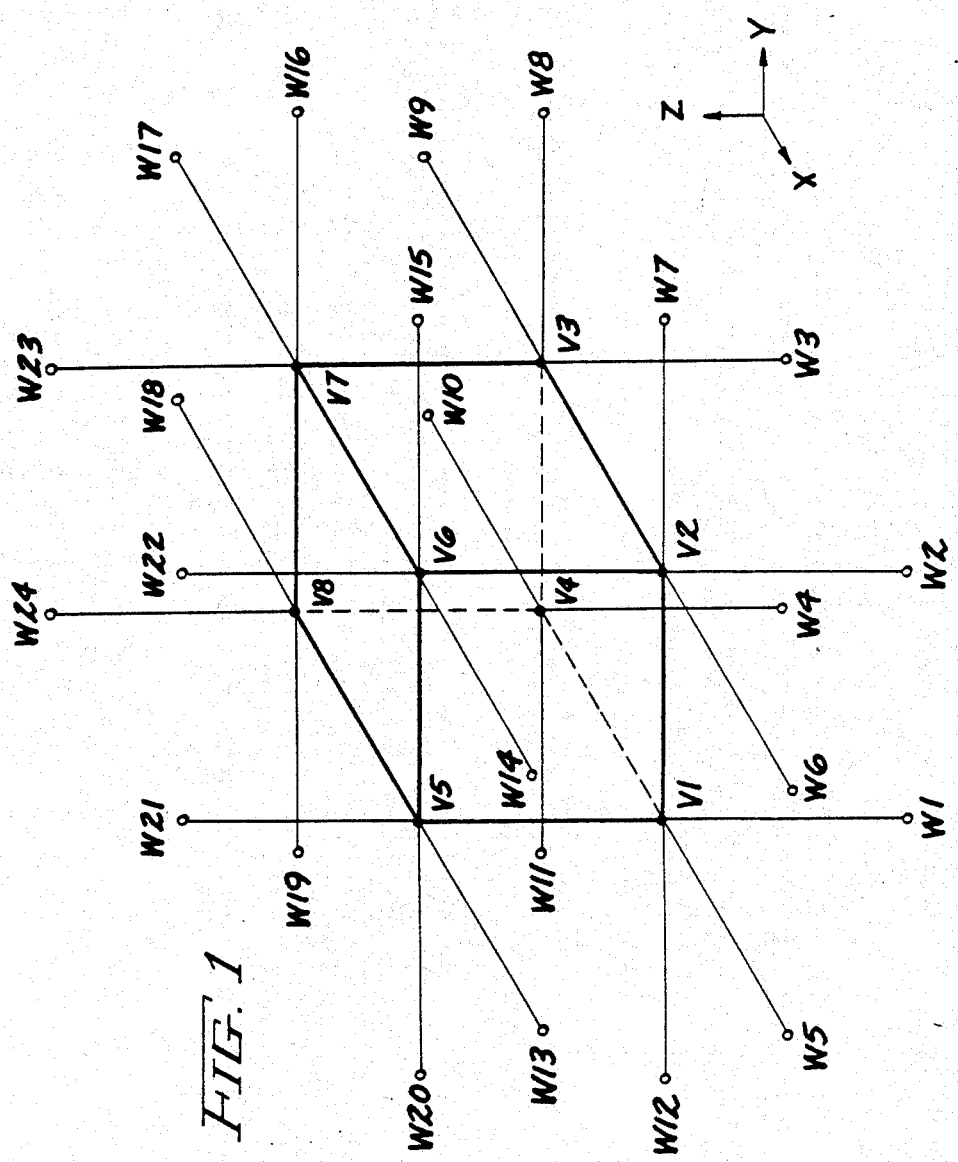
FIG. 1 is a perspective view illustrating a single voxel element defined by 8 grid locations and surrounded by twenty-four additional data points.

In the method and apparatus of the present invention, a sequence of voxel elements is examined. In a preferred embodiment of the present invention, data from four consecutive MR or CT scan slices is analyzed at a time. The reason for the desirability of employing four slices of data is seen in FIG. 1 which illustrates a single voxel element with vertices V1 through V8 as shown. Each voxel element naturally spans two slices of image information. Associated with each vertex point is a signal pattern value which represents a measurement of at least one physical property which is associated with a three dimensional body at regularly spaced grid locations within the body. The grid locations define volume elements or voxels. Additionally, for the practice of the present invention, each voxel vertex V1 through V8 is also associated with three adjacent grid locations. These adjacent grid locations are the ones which lie along grid coordinate lines and which are not specifically included in the voxel itself. There are twenty-four such data points. For example, it is seen that vertex V1 is associated with grid locations W1, W5, and W12. In a similar fashion, vertex location V7 is associated with grid locations W16, W17, and W23. These other, additional grid locations are shown as open circles in FIG. 1. The voxel grid locations themselves are shown as filled-in circles. It is therefore seen that each voxel vertex grid location is associated with three adjacent grid locations. In FIG. 1, these additional grid locations are labeled as W1 through W24, as shown. It is therefore seen that these additional grid locations are twenty-four in number and occupy 4 data slices. In the system and method of the present invention, the data values at these additional grid locations are employed, along with the data values at the voxel vertex locations, to generate data value triplets which represent normal vectors associated with each vertex point V1 through V8. The various normal vector components are computed using finite difference methods, a central difference in particular. For example, to compute the x component of the normal vector at vertex V1, data values at vertex V4 and grid location W5 are differenced. In a like manner, the z component of the normal vector associated with vertex V1 is similarly computed using data values at grid locations V5 and W1. Lastly, the y component of the normal vector associated with vertex V1 is generated using the data values associated with grid locations V2 and W12. The order in which the difference is taken is naturally selected to be consistent with the orientation of some coordinate system (see axes) and the method is employed uniformly throughout for the other voxels. In this manner, it is seen how data from 4 slices is employed to generate normal vectors associated with each voxel vertex location. The resulting vector formed from differences is then scaled to unit magnitude.

Figure 2:
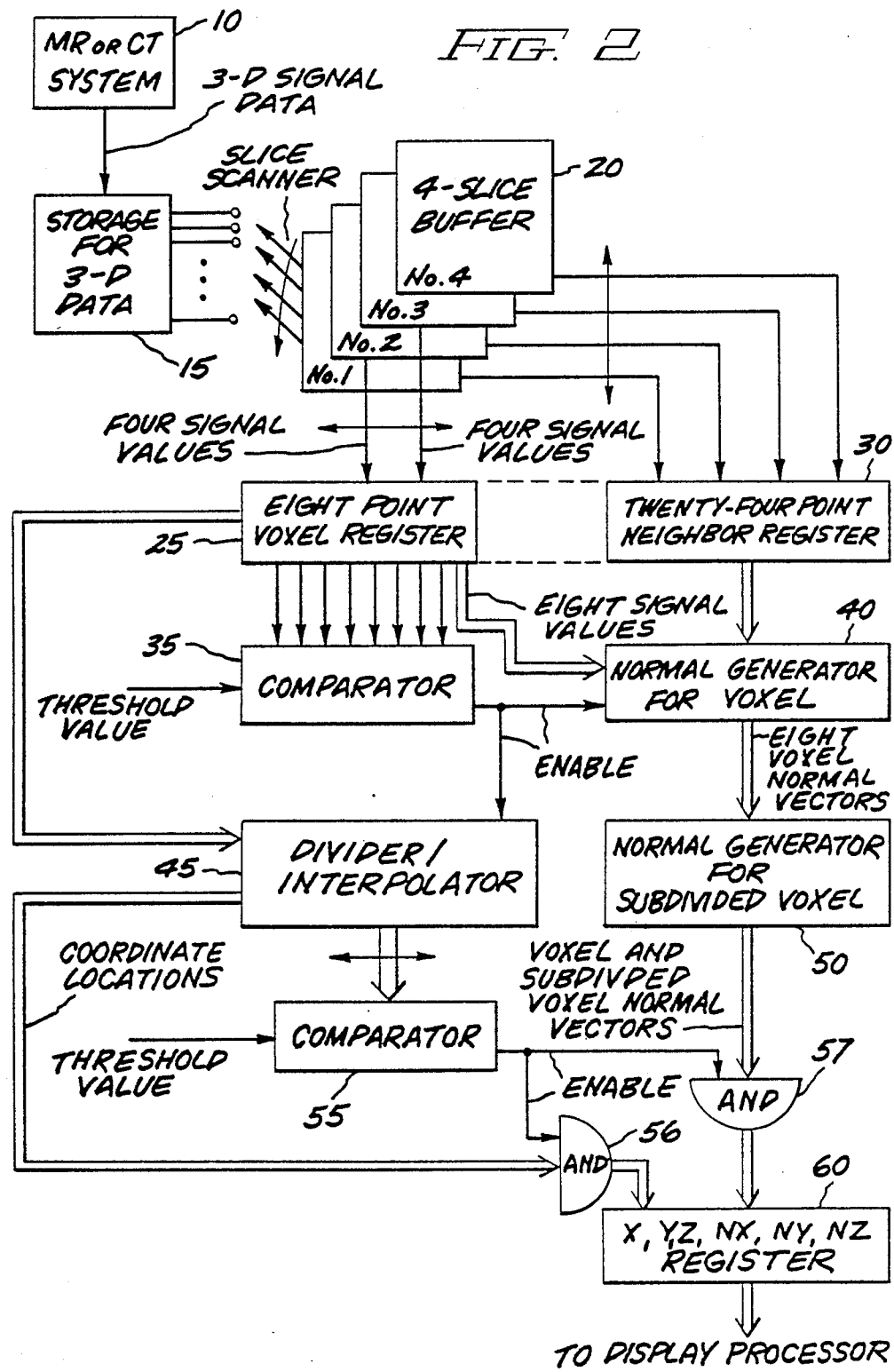
FIG. 2 is a schematic diagram illustrating both the apparatus and method of the present invention.

FIG. 2 illustrates, in schematic form, a flow chart and hardware description of a system in accordance with the present invention. In one embodiment of the present invention, three dimensional signal data is provided from an MR or CT scan system 10. This data is typically stored in an appropriate storage system 15. Typically this storage system comprises some form of magnetic storage medium such as a floppy disk, hard disk drive, or tape. The data is organized in a format which permits associating each physical measurement representation with a corresponding grid location associated with that measurement.

In a preferred embodiment of the present invention, four slice buffer 20 is employed. This buffer includes layers No. 1, No. 2, No. 3, and No. 4, with each memory layer containing representations for the signal pattern values at the various grid locations. Each layer preferably contains the data for an entire two dimensional slice of the body being imaged. A slice scanner is employed so as to scan through the data along one of the axis directions. In the preferred embodiments of the present invention, there is a direct correlation between buffer address values and the grid locations within the body. It should be borne in mind that as one scans through the data in one axis direction by means of the slice scanner, it is only necessary to retrieve a single additional slice of information at a time. In short, the scanner can be made to operate in a fashion so that only data from a single image plane need be retrieved at one time. As indicated in FIG. 2, additional scanning is performed throughout layers No. 2 and No. 3 of buffer 20. It is these intermediate layers which contain grid locations at voxel vertices. Four signals values from one voxel face are provided from layer 2 and at the same time, four signal values from layer 3 are similarly provided to voxel register 25. The four signal values from layer No. 3, of course, correspond to the four vertices opposite the voxel slice selected from layer No. 2. Thus, each voxel element is defined by four grid locations from layer No. 2 and four grid locations from layer No. 3 of buffer 20. As indicated by the horizontal double headed arrows on the flow path lines from layers No. 2 and No. 3 to register 25, the operation of the present invention proceeds from voxel to voxel by means of scanning operations carried out in layers No. 2 and No. 3. Corresponding to the selection of each voxel element, a total of eight values is therefore supplied to voxel register 25. At the same time, twenty-four additional measurements are provided to voxel neighbor register 30. Dotted lines are shown connecting registers 25 and 30 to indicate that in practice, these registers might actually comprise a single thirty-two cell register. Each cell in the register contains the corresponding physical measurement in an appropriate and consistent representational format. In this way, for each voxel element, the values associated with vertices V1 through V8 are supplied to register 25. In a like fashion, the physical measurement values associated with additional grid locations W1 through W24 are supplied to register 30.

Each of the eight signal values from register 25 are supplied to comparator 35. Comparator 35 operates to compare each of the eight values supplied with a user supplied threshhold value. If all eight of the comparison results are the same, then it is clear that the surface selected by the threshhold does not pass through the particular voxel being analyzed. In this case, the enable line inhibits output generation for that voxel. If any of the comparisons generated by comparator 35 are different than the other comparisons, then normal vector generation is enabled. The generation of normal vectors is accomplished in functional block 40 which is provided with the eight signal values from voxel register 25 and the twenty-four signal values from neighbor register 30. In short, the physical measurement values associated with vertices V1-V7 are supplied from register 25 and the corresponding physical measurement values associated with additional grid locations W1-W24 are supplied from register 30. When enabled for a given voxel element, normal generator 40 operates to produce eight normal vectors associated with vertices V1-V8. This normal generation is accomplished by the differencing method described above. Although it is not necessary at this point in the process, normal generator 40 may also operate to adjust the magnitude of the normal vectors generated so that each possesses a unit magnitude.

An important function of the present invention is provided by divider/interpolator 45. This operation is also enabled by the results of comparator 35. In particular, when a voxel is found which contains a segment of the surface defined by the threshhold value, additional operations are enabled. These additional operations generate additional data values associated with additional grid locations within a selected voxel element. Additionally, normal vectors are also generated for each additional grid location constructed by voxel subdivision and interpolation. For example, functional block 45 operates upon the eight signal values from register 25 to produce a set of additional interpolated measurement values, preferably by linear interpolation. For example, the grid location midway between two voxel vertices may be assigned a measurement value equal to one half the sum of the measurement values at the two adjacent voxel locations. In a like manner, a grid location which lies in the middle of a voxel face, may be assigned a measurement value which is equal to one fourth of the sum of the measurement values assigned to each of the vertex grid locations associated with that face. Similarly, a grid location contained within the center of the voxel may be assigned a measurement value which is equal to one eighth of the sum of the measurement values associated with all eight of the voxel data values. Thus, for each voxel selected, a subdivision operation occurs. It is noted that it is preferable to divide the voxel element into subdivisions along the various grid axes corresponding to the same power of two. For example, subdivision by a factor of one half is common in the practice of the present invention. However, subdivision by other integers is also possible and it is also possible to employ different subdivision units in different coordinate directions. See FIG. 6. In exactly the same fashion, normal generator 50 produces normal vectors associated with each of the grid locations for the subdivided voxels. For example, the normal vectors associated with an edge point between two voxel vertices is generated as one half of the vector sum of the normal vectors associated with that particular edge. Analogous results are generated for additional normal vectors associated with cube faces and interiors. Functional block 50 also preferably operates to scale each of the normal vectors generated to fix the magnitude of each vector generated at unity. Custom integrated circuit chips are available for performing such square root operations necessary for magnitude normalization of the normal vectors generated. (Note though that here normalization is used in two different senses, one to describe the magnitude of the vector and another to indicate that the vector is at least approximately normal to the surface determined by the threshhold value.) Accordingly, for each voxel selected as a result of the comparison performed by comparator 35, divider/interpolator 45 produces a set of interpolated measurement values corresponding to a more finely divided voxel element. In the same manner, normal generator 50 provides signal values representing normal vectors occurring at voxel vertices and also at intermediate and internal grid locations. For each selected voxel element, there is a fixed number of sub-voxel elements generated. As suggested by the double ended horizontal arrow between divider/interpolator 45 and comparator 55 each sub-voxel is scanned and compared with the same threshhold value as above. This comparison operation is performed by comparator 55 for each sub-voxel element. The comparison operation is essentially the same as that described above. When comparisons with the threshhold value are made with respect to a single subdivided volume element and when different comparison results are obtained for at least two of the eight comparisons made, then output of appropriate location and normal vector directions is made. In this fashion, the output of comparator 55 enables and gates 56 and 57 to supply signal values to output register 60. Accordingly, for each selected sub-voxel element within a selected voxel element, a set of grid location values x, y, and z together with the components of a normal vector at that location, are provided to register 60. Although not specifically shown in FIG. 2, divider/interpolator 45 also employs slice and voxel scanner data to penetrate x, y, and z location values to be associated with each normal vector in register 60. Accordingly, register 60 contains grid locations along the x, y, and z axes and normal vector components corresponding to the surface normal vector at that location. It is this information which is supplied to a conventional display processor.

Figure 3:
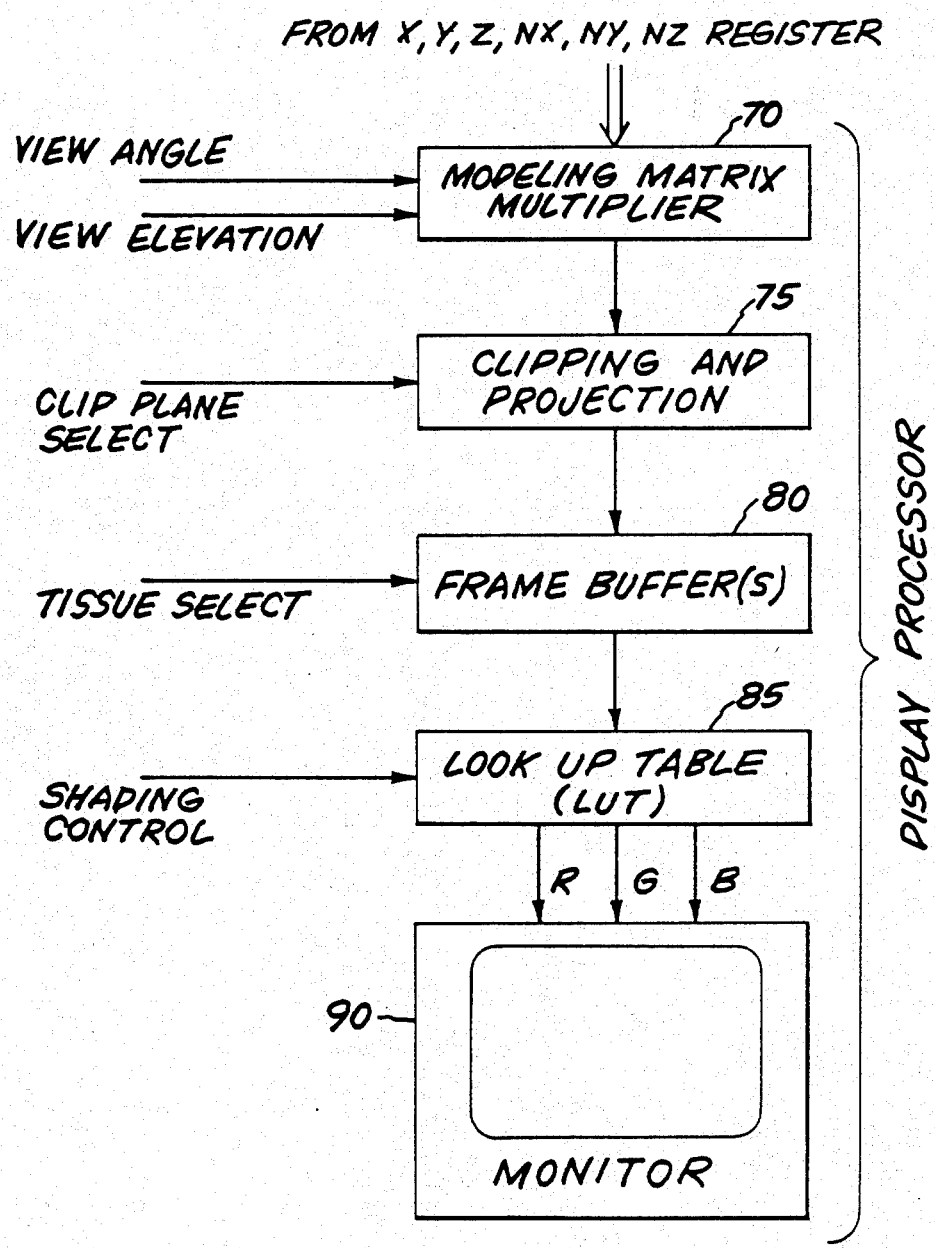
FIG. 3 is a schematic diagram more particularly illustrating various functionalities which may be employed in a display processor used in the present invention.

Such a processor is illustrated in FIG. 3. It is important to keep in mind that the output signals from register 60 may be stored in an intermediate form, such as on a magnetic medium or in memory for a period of time prior to supplying this information to a display processor. FIG. 3 illustrates a substantially conventional display processor which receives positional and normal vector information. This enables the processor to generate pixel information on a screen with appropriate shading. For example, the user may supply a view angle and view elevation as part of a matrix multiplication function performed by block 70. Likewise, as in conventional display processing systems, a clip plane may be selected to effectively eliminate data points on one side thereof. This is useful is generating cross-sectional images. This function is carried out in block 75. Additionally, it is possible to store overlapping images in one or more frame buffers, such as buffer(s) 80. One of these buffer may be provided with information based upon a particular threshhold value, say for example, the threshhold value determined by skin with the contents of another frame buffer being loaded with image data developed from a different threshhold value, say that value associated with bone. This enables information to be displayed concurrently or may in fact enable part of the display to depict one tissue type and another part of the display to depict a second tissue type. A shading control may also be provided by means of lookup table 85 (LUT) which serves to select colors (red, green, blue) for each pixel displayed depending upon position, tissue type (threshhold) and normal vector information. The pixels are displayed on monitor 90. While the display processor portion of the present invention comprises conventional and well known hardware elements, these elements are configured to cooperatively interact with the selection of a threshhold value and various other selectable parameters, as indicated in FIG. 3.

In the display processor illustrated in FIG. 3, the image is produced by calculating the intensity from the component of the normal that is perpendicular to the viewing plane. Hidden surfaces are removed by the painter's algorithm, that is, the more distance surfaces are painted over by the closer surfaces as the image is scanned from front to back. By permuting the normal components and the order of scanning, six views of the three dimensional image may be produced. The operations of testing, subdividing, and finding the normal may be implemented rapidly with special purpose hardware which is well known in the electronic graphics arts.

Figure 4:
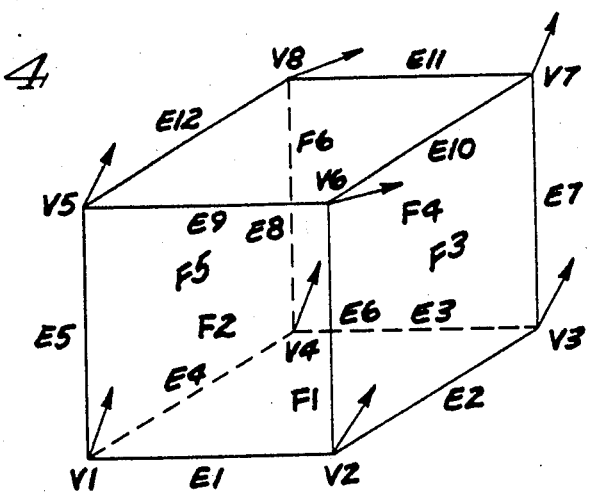
FIG. 4 is a perspective view illustrating surface normal vectors associated with each voxel vertex.
Figure 5:
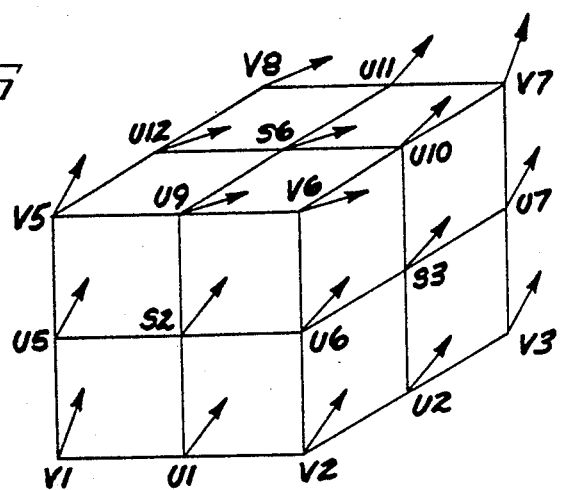
FIG. 5 is a perspective view similar to FIG. 4 more particularly illustrating the generation of additional normal vectors associated with a subdivided voxel.
Figure 6:
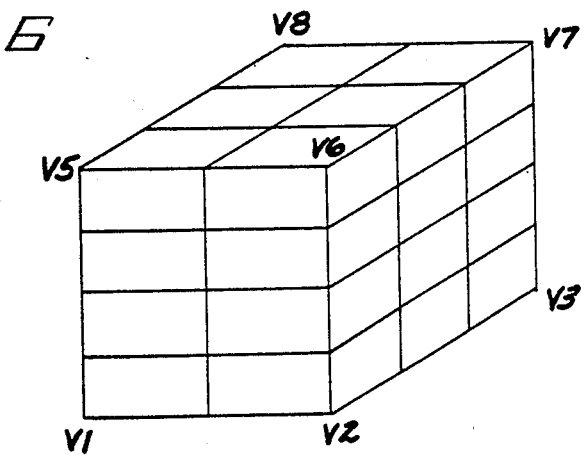
FIG. 6 is a perspective view similar to FIG. 4 which particularly illustrates the fact that subdivision operations may be performed in such a way as to divide the volume element into differently sized subelements along distinct grid axis directions.

FIG. 4 illustrates a single voxel with vertices V1–V8. At each vertex, a normal vector is defined. In accordance with the method of the present invention, however, only certain vertices or grid locations are selected. Each selected vertex is, however, always associated with a normal vector. Each voxel element includes edges E1-E12, as shown. Additionally, each voxel element includes faces F1-F6, as shown. More particularly, with respect to the present invention, each selected voxel element is subdivided in the direction of the three axes corresponding to the various grid locations. For example, FIG. 5 illustrates a subdivision in which each voxel edge is divided into two equal parts by an intermediate point. For example, edge E1 includes intermediate point U1 and a computed normal vector associated therewith. Similarly, face F2 includes facially centered point S2 and a normal vector associated therewith. In the manner described above for computation of normal vectors, the normal vectors or points, S1-S6 corresponding to faces F1-F6. Also, in the same manner as described above, additional vectors are defined at points U1-U12 corresponding to edges E1-E12. For the subdivision shown in FIG. 5, an additional interior point (not shown) is also defined and associated with a normal vector which is generated as an arithmetic average of adjacent vectors. Thus, the single voxel shown in FIG. 4 is subdivided into eight subvoxel elements in FIG. 5 with 27 grid locations and 27 normal vectors associated therewith. This is in contrast to FIG. 4 which includes only eight grid locations and eight associated normal vectors. It is believed that this subdivision operation is at least partially responsible for the smooth, high resolution images produced by the system of the present invention. It is also noted, however, that the system of the present invention is flexible in that it is not always necessary to divide the edges of each voxel so as to create subdivisions whose number is a power of two. In particular, FIG. 6 illustrates the fact that voxel subdivisions may be made in any practical integer number of subdivisions. Moreover, each coordinate direction may involve a different number of subdivisions. This is particularly useful in situations in which resolution is not identical in all directions. For the case shown in FIG. 6, twenty-four subdivisions are made. In the system of the present invention, the number of subdivisions made for each voxel is the same throughout the image. The number and nature of subdivision, however, may be selectable at the outset of image generation. This is a particularly useful aspect of the present invention in that it enables the operator to more closely match screen resolution monitor 90 with resolution found in the data itself. This is also particularly useful for zooming operations.

Figure 7:
FIG. 7 is a photograph illustrating a medical application of the present invention in which it is seen that both skin and bone threshhold values may be selected for different portions of the data display.

Graphical images of medical data have been generated in accordance with the invention herein. A particular result of such processing is illustrated in FIG. 7. In addition to indicating the excellent resolution obtainable, FIG. 7 also illustrates the fact that both skin and bone surfaces may be displayed in the same graphic image. FIG. 7 also illustrates the fact that the user may select that portion of the frame which displays one tissue type with another portion of the frame displaying another tissue type. In FIG. 7, the tissue types are skin and bone. These are relatively simple operations for the display processor to perform once the grid locations have been selected, additional grid points defined, and normal vectors produced for both the original and additional grid locations.

From the above, it should be appreciated that the method and apparatus of the present invention produces high resolution, three dimensional images from any measurement system which provides measurement of a physical property associated with a three dimensional array of grid locations defined throughout a region being studied. While the above description has primarily been directed at the generation images as they would appear to the human eye, if visible, it is also to be noted that since the system is based upon the measurement of physical properties, some of the images that may be produced might, for example, be representative of the distribution of chemical compounds, for example, as they might be distributed throughout a body. While images of this distribution would not be visible to the human eye, nonetheless, such images are readily generated by the present invention. It is also seen that the objects of the present invention have been met particularly in that the screen resolution is readily accommodated by judicious prior selection of an appropriate degree of subdivision processing. It is also seen that the method of the present invention is accomplished rapidly because of the elimination of voxel elements and subvoxel elements which do not contain surface intersections.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A system for displaying three dimensional surface structures, said system comprising:
   means for storing three-dimensional signal patterns representing the value of at least one physical property associated with a three dimensional body at regularly spaced parallelopiped grid locations defining volume elements within said body;
   means for retrieving the thirty-two three dimensional signal pattern values associated with each set of eight cubically adjacent grid locations and the twenty-four additional grid locations adjacent to said eight cubically adjacent grid locations, each of said cubically adjacent grid locations being associated with three of said additional grid locations;
   first comparison means for comparing the signal values associated with said eight adjacent grid locations with a predetermined threshhold value to determine those volume elements for which at least one of said eight comparison results is distinct from the other seven comparison results so as to identify selected volume elements through which a surface determined by said threshhold value passes;
   first generating means for generating normal vectors from said thirty-two signal pattern values for each of said eight cubically adjacent grid locations associated with each selected volume element;
   second generating means for generating, for each selected volume element defined by said eight cubically adjacent grid locations, a plurality of additional signal values associated with additional spacial locations defined along the edges and within the interior of said selected volume element, said additional spacial locations corresponding to subdivision of said volume element;
   second comparison means for comparing the signal values associated with each set of eight cubically adjacent spacial locations associated with each of said volume element subdivisions with said predetermined threshhold value to determine those subdivided volume elements for which at least one of said subdivision comparison results is distinct from the other seven comparison results, so as to generate a sequence of values identifying selected grid and additional spacial locations which at least approximately lie on a surface determined by said threshhold value;

third generating means for generating normal vectors associated with said additional spacial locations, said selected grid locations and additionally selected spacial locations being generated so as to be associated with the corresponding normal vectors for said locations; and display processor means for receiving said associated location values and normal vectors and providing a shaded image on a screen, said image representing said surface determined by said threshhold.

2. A method for displaying three dimensional surface structures, said system comprising:

storing three-dimensional signal patterns representing the value of at least one physical property associated with a three dimensional body at regularly spaced parallelopiped grid locations defining volume elements within said body;

retrieving the thirty-two three dimensional signal pattern values associated with each set of eight cubically adjacent grid locations and the twenty-four additional grid locations adjacent to said eight cubically adjacent grid locations, each of said cubically adjacent grid locations being associated with three of said additional grid locations;

comparing the signal values associated with said eight adjacent grid locations with a predetermined threshhold value to determine those volume elements for which at least one of said eight comparison results is distinct from the other seven comparison results so as to identify selected volume elements through which a surface determined by said threshhold value passes;

generating normal vectors from said thirty-two signal pattern values for each of said eight cubically adjacent grid locations associated with each selected volume element;

generating, for each selected volume element defined by said eight cubically adjacent grid locations, a plurality of additional signal values associates with additional spacial locations defined along the edges and within the interior of said selected volume element, said additional spacial locations corresponding to subdivision of said volume element;

comparing the signal values associated with each set of eight cubically adjacent spacial locations associated with each of said volume element subdivisions with said predetermined threshhold value to determine those subdivided volume elements for which at least one of said subdivision comparison results is distinct from the other seven comparison results, so as to generate a sequence of values identifying selected grid and additional spacial locations which at least approximately lie on a surface determined by said threshhold value;

generating normal vectors associated with said additional spacial locations, said selected grid locations and additionally selected spacial locations being generated so as to be associated with the corresponding normal vectors for said locations; and receiving said associated location values and normal vectors in a display processor operating to provide a shaded image on a screen, said image representing said surface determined by said threshhold.

3. A system for displaying three dimensional surface structures, said system comprising:

means for storing three-dimensional signal patterns representing the value of at least one physical property associated with a three-dimensional body at regularly spaced parallelopiped grid locations defining volume elements within said body;

means for accessing the signal pattern associated with each grid location;

means for providing the three-dimensional location associated with each said grid location;

means for identifying, from said signal pattern values and said associated three-dimensional grid location values, which of said grid locations lie adjacent to a select surface within said body;

means for generating the normal vector to one side of said surface at said identifying grid locations; and display processor means for receiving said associated location and normal vectors and providing a shaded image, said image representing said select surface.

4. The system of claim 3 in which said means for identifying which of said grid locations lie adjacent to said select surface comprises:

means for retrieving seven three-dimensional signal pattern values which together with said grid location constitute a cubically adjacent set of eight grid locations; and comparison means for comparing the signal values associated with said eight cubically adjacent grid locations with a predetermined threshold value to determine if one of said eight comparison results is distinct from the other seven comparison results so as to identify selected volume elements through which said select surface, determined by said threshold, passes.

5. The system of claim 3 in which means for generating said normal at said identified grid location comprises means for determining the unit normalized gradient of said three-dimensional signal pattern at said grid location.

6. The system of claim 5 in which means for determining the gradient of said three-dimensional signal pattern at said grid location includes means for accessing grid locations adjacent to said identified grid location.

7. The system of claim 3 further including means to magnify said image of said surface by interpolation of said three-dimensional signal patterns.

8. A system for displaying three-dimensional surface structures, said system comprising:

means for storing three-dimensional signal patterns representing the value of at least one physical property associated with a three-dimensional body at regularly spaced parallelopiped grid locations defining volume elements within said body;

means for accessing the signal pattern associated with each grid location;

means for providing the three-dimensional location associated with each said grid location;

means for identifying, from said signal pattern values and said associated three-dimensional grid location values, which of said volume elements are intersected by a select surface within said body;

means for generating, for each identified volume element, a plurality of additional signal values and additional three-dimensional location values associated with additional spatial locations defined along the edges and within the interior of said identified volume element, said additional spatial locations corresponding to subdivision of said volume element;

means for identifying, for each subdivided volume element, which of said grid locations in said subdivided volume element lie adjacent to said surface;

means for generating the normal vector to one side of said surface at said identified grid locations in said subdivided volume element; and display processor means for receiving said associated location values and normal vectors and providing a shaded image, said image representing said select surface.

* * * * *